United States Patent [19]

McElroy

[11] 4,352,708
[45] Oct. 5, 1982

[54] DEFINED FORCE FUSION MACHINE FOR JOINING PLASTIC PIPE

[76] Inventor: Arthur H. McElroy, P.O. Box 15580, Tulsa, Okla. 74112

[21] Appl. No.: 179,030

[22] Filed: Sep. 8, 1980

[51] Int. Cl.³ .................... B29C 27/12; B32B 31/20; F16L 47/02
[52] U.S. Cl. .................... 156/378; 156/158; 156/304.2; 156/304.6; 156/499; 156/503
[58] Field of Search ............... 156/304.2, 304.6, 499, 156/378, 158, 503

[56] References Cited

U.S. PATENT DOCUMENTS

| | | | |
|---|---|---|---|
| 3,013,925 | 12/1961 | Larsen | 156/499 |
| 3,552,265 | 6/1971 | Lucas | 156/258 |
| 3,729,360 | 4/1973 | McElroy | 156/499 |
| 3,743,562 | 7/1973 | Phipps | 156/64 |
| 3,846,208 | 11/1974 | McElroy | 156/499 |
| 4,174,248 | 11/1979 | Carroll et al. | 156/499 |
| 4,263,084 | 4/1981 | Takala | 156/499 |

Primary Examiner—James C. Cannon
Attorney, Agent, or Firm—Head, Johnson & Stevenson

[57] ABSTRACT

A portable wheeled apparatus for fusing plastic pipe having a support frame with stationary clamps attached thereto and movable clamps in axial alignment therewith. A first pipe section is secured within the stationary clamps and a second pipe section is secured within the movable clamps and are brought into contact for facing, heating and fusing by a manually operated handle. The apparatus is provided with retention devices to maintain a given axial force applied to the pipe sections during fusing. An indicator device is in communication with the movable clamps to display the force applied to the pipes.

12 Claims, 7 Drawing Figures

DEFINED FORCE FUSION MACHINE FOR JOINING PLASTIC PIPE

BACKGROUND OF THE INVENTION

1. Field of the Invention

The present invention relates to a portable apparatus for fusing plastic pipe and, more particularly, an apparatus which is provided with means to bring two molten ends of pipe sections into fusing contact and means to maintain and indicate the force applied to the pipes during fusing.

2. Description of the Prior Art

With the advance of plastic technology, there is an ever increasing use of plastic (i.e. polyethelene) pipe in commercial and residential applications. The plastic pipe is replacing metal pipe due to the fact that it is both lighter in weight and corrosion resistant. Plastic pipe may be formed in sections with one end having an upset or sleeved end with the rear or non-enlarged end of an adjacent section of pipe received therein. It is more economical to connect pipe sections without the necessity of sleeved ends by heating and then fusing pipe sections together. Various devices have been designed in the past which achieve these purposes and are described and shown in U.S. Pat. Nos. 3,013,925, 3,552,265 and 3,729,360. These prior art devices have ranged from simple hand operated devices to large trailer mounted hydraulically operated devices. In fusing plastic pipe utilizing a manually operated device, it has been difficult to maintain adequate axial pressure or force on the pipe sections being fused to ensure a proper bond. There has been no prior art devices with latch means for use with manually operated fusion devices to maintain a given pressure. Also, there has been no prior art means on these manual devices for the operator to know the amount of pressure or force applied to the pipe sections being fused.

SUMMARY OF THE INVENTION

The present invention generally provides a portable wheeled apparatus for fusing molten pipe sections together that can be easily transported and used by one person. The present invention, more particularly, comprises a support frame with wheels attached thereto and a plurality of stationary clamp means connected to the support frame and adapted to retain a molten end of a first section of pipe in a fixed axial position. Movable clamp means, adapted to retain a molten end of a second section of pipe axially spaced from the molten end of the first section of pipe, are supported upon guide rods, which are fixed to said support frame on each side of the pipe with the axes of which lie in an imaginary plane which intersects the axis of the first and second pipe end. The movable clamp means are moved by handle means pivotally connected thereto and a bar connected to the fixed clamp means so as to bring the molten pipe ends into contact for fusion. The present invention is adapted to hold a pipe section transversely to the movable clamp means and in the same plane for fusing a second pipe or pipe fitting to the side wall of the transverse pipe.

When the pipe sections are brought into contact and a force is applied thereto by the handle means, an indicator device displays to the operator the amount of force which is being applied to the pipe to ensure that a proper bond is made. The indicator device is in communication with a U-shaped bracket which is attached to the movable clamp means with the elongated handle pivotally connected thereto. When the pipe sections are brought into contact and a force is applied thereto the U-shaped bracket will deflect and this deflection is translated into pressure increments for display to the operator. In that it is tiring to maintain a prescribed force to the pipe sections through the handle means while the fusing process is completed, a retention device is provided on the apparatus to free the operator. The retention device is comprised of a pivotally mounted pin attached to the handle means which is received into a block having an opening therein, which is connected to the fixed clamp means. The block is pivotally connected and biased by means of a spring or other device to prevent the retention of the pin and thereby maintain the applied force.

The present invention provides a simple easily transportable apparatus for fusing plastic pipe which has the capability of end-to-end or axial or "butt" fusing or sidewall fusing.

DETAILED DESCRIPTION OF THE PREFERRED EMBODIMENTS

Figure 1:
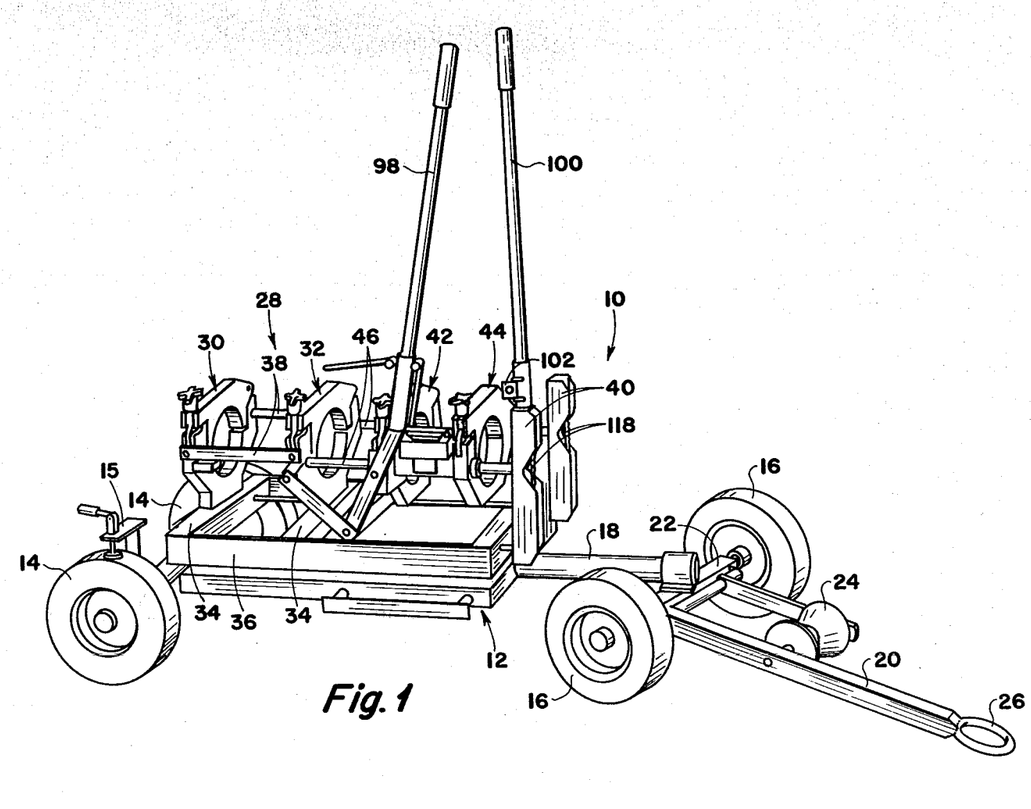
FIG. 1 is a side perspective view of a fusion apparatus embodying the present invention.

Referring to the drawings in detail, reference character 10 generally indicates a fusion apparatus for fusing thermoplastic pipe. As shown in FIG. 1, the apparatus 10 is comprised of lower structural frame 12 to which are adapted a pair of rear wheels 14 with a brake means 15 and a pair of forward wheels 16, the forward wheels 16 being pivotal to the frame 12 for guiding the apparatus 10. A central structural frame 18 extends across the frame 12 longitudinally. An offset tongue 20 is pivotally connected to a cross bar 22, which is structurally connected to the forward wheels 16 of the structural frame 18. The tongue 20 is provided with a centrally spaced roller 24 (the operation of which will be described in more detail herein below) and a ring opening 26 permitting the attachment of the apparatus 10 to a moving vehicle as desired.

A pipe fusion assembly 28 is removably attached to the frame 12 by means of a plurality of clips or other suitable means and is removable for use as a fixed location wherein a pipe (not shown) is brought to the assembly 28 as opposed to moving the assembly relative to the pipe. This further permits the assembly to be positioned within a "bell hole" of an existing buried pipeline for repair of the same.

Figure 2:
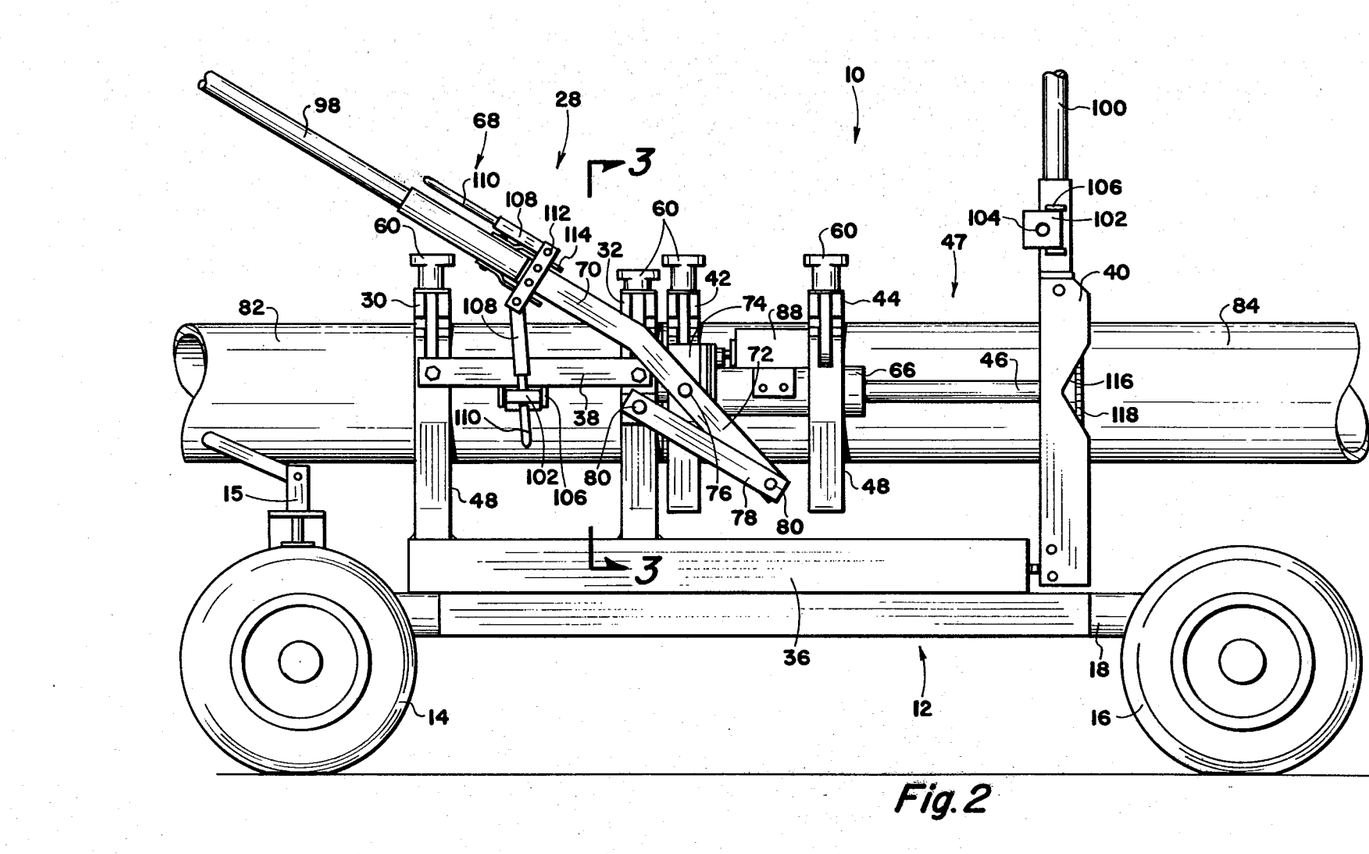
FIG. 2 is a side elevational view of the present invention with a pipe being secured therein.

As shown in FIG. 2, the assembly 28 includes a pair of spaced and fixed jaw assemblies 30 and 32 connected at a lower portion thereof to cross members 34 of a frame 36. The jaw assemblies 30 and 32 are spaced apart and held in upright parallel position by means of opposed horizontal bars 38, which are bolted or connected in any suitable manner to the jaw assemblies 32. A pair of spaced vertical end supports 40 are connected to the frame 36 in line with and opposite from the fixed jaw assemblies 30 and 32. Between the end supports 40 and the fixed jaw assemblies 30 and 32 are movable assemblies 42 and 44. On opposite sides of the jaw assemblies 42 and 44 and extending between the end supports 40 and the fixed jaw assembly 32 are oppositely spaced guide rods 46. The axis of the guide rods 46 lying within an imaginery plane which includes the central axis of the fixed and movable jaw assemblies as well as a pipe 47 secured therein.

Figure 3:
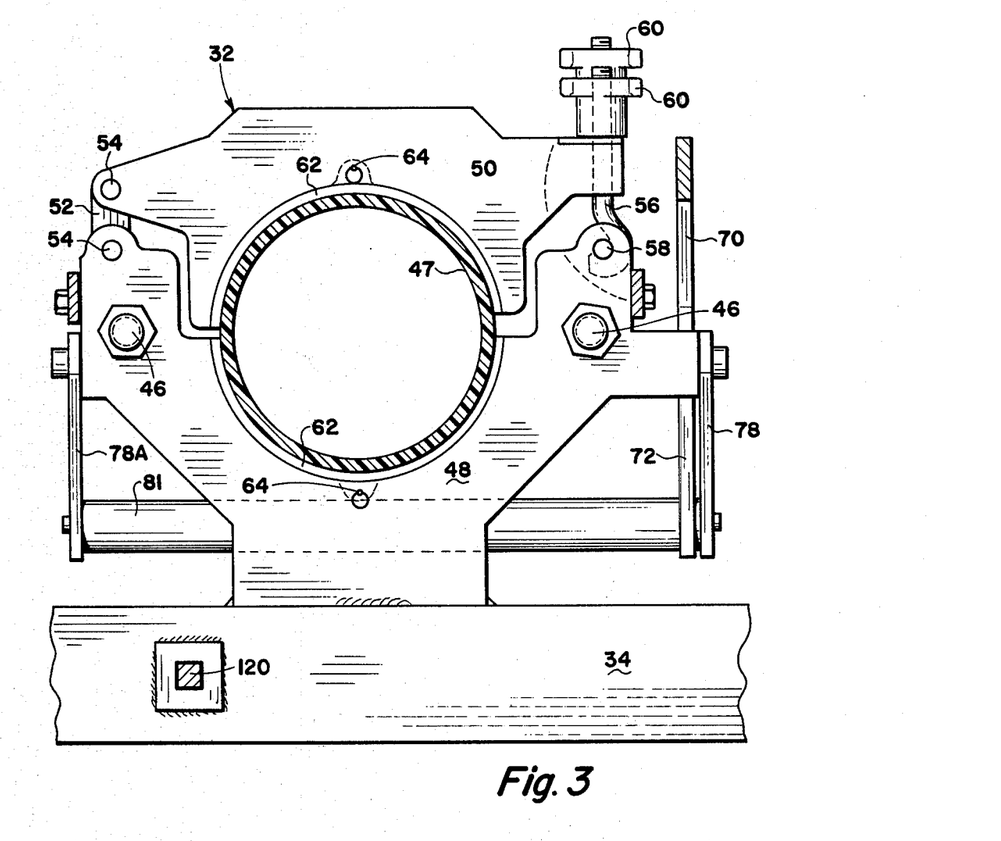
FIG. 3 is a view taken along line 3—3 of FIG. 2.

The jaw assemblies are approximately identical and as shown in FIG. 3 are comprised of a lower portion 48 and an upper portion 50 which is pivotally secured to the lower portion 48 by means of a bar 52 and rods 54 extending therethrough. Oppositely spaced from the pivotal connection and pivotally connected within a cavity in the upper portion 50 is a J-hook which is receivable within a cavity and around a bar 58 in the lower portion 48. An upper portion of the J-hook 56 is threaded and a knob 60 is threaded thereonto and draws the upper portion 50 into contact with the lower portion 48. The upper portion 50 is pivoted open and the pipe 47 is directed therebetween and then is closed and secured around the pipe by means of the J-hook 56 and knob 60. The lower portion 48 and upper portion 50 are both provided with clamp facings 62 which are received into and secured within the portions 48 and 50 by means of pins 64. The clamp facings 62 are planar and in the event that the pipe is out of round the clamping action of the jaw assemblies reshapes and securely holds the pipe. Different diameter pipes may be securely held within the fusing apparatus 10 by means of changing the clamp facings 62 and inserting new clamp facings which have a smaller or larger diameter circumference as needed.

The movable jaw assemblies 42 and 44 are spaced apart by means of a cylinder 66 with guide rods 46 extending therethrough. In order to reciprocate the movable jaw assemblies 42 and 44 upon the guide rods 46 a pivotal handle means designated by number 68 is connected to the apparatus 10. The handle means 68 is comprised of an elongated handle 70 having an angled lower portion 72 pivotally secured to a bracket 74, which is connected to the movable jaw assembly 42 by means of a bolt 76. A pivotal bar 78 is connected at one end to the fixed jaw assembly 32 and at an opposite end the lower portion 72 of the handle 70 by means of bolts 80. A bar 81 extends perpendicularly to the central axis of the apparatus 10 between and adjacent the lower portion 48 of the jaw assemblies 42 and 44 and is pivotally secured to a bar 78A. As can be seen, when the handle 70 is rotated the movable jaw assemblies 42 and 44 in unison are moved towards or away from the fixed jaw assemblies 30 and 32.

In operation the apparatus 10 is used in construction of pipelines using polyethylene or other types of plastic pipe in which the ends of the pipe are directly fused and sealed together without collars, couplings or other attachment devices. Further, the invention may be used in conjunction of joining plastic pipe by other means such as using solvents, or couplings, or using metallic pipe. In use, the apparatus 10 is adapted to be placed beneath the first or trailing section of pipe 82 (as shown in FIG. 2) to a position wherein the end of that pipe is intermediate the fixed jaw assembly 32 and the movable jaw assembly 42. The upper portion 50 of the jaw assemblies 30 and 32 are actuated so as to receive and securely hold the pipe 82 therein. The next adjacent piece of pipe 84 to be fused is placed within the open jaw assemblies 42 and 44 to a position where its end is intermediate the fixed jaw assembly 32 and the movable jaw assembly 42 adjacent the fixed end of the pipe 82 previously positioned. Sufficient space is provided between the two pipe ends to permit the positioning of a facing cutter (not shown) which cleans and faces the pipe ends. The handle 70 is then rotated to bring the pipes 82 and 84 into contact with the cutter thereby creating substantial parallel edges of the pipe ends. The direction of the movement of the handle 70 is then reversed and the pipe end cutter is removed whereupon a dual faced heating element (not shown) is inserted therebetween. The process of moving the pipe 84 by means of the handle 70 is repeated and the pipe ends come into contact with the heater whereupon the pipe ends are softened. The pipe ends are then moved apart by the rotation of the handle 70, the heater is removed and then the pipe 84 is brought quickly into contact with the pipe 82 whereby the softened ends of each pipe join and fuse together. Thereafter all the upper portions 50 of the fixed and movable jaw assemblies 30, 32, 42 and 44 are opened and the now fused joint of pipe is raised slightly above the lower portions 48 by means of raising the tongue 20 and having the roller 24 comes into contact with lower portion of the pipe 84 thereby raising the joint of pipe. The tongue 20 may be maintained at an elevated position to support the length of pipe 84 by means of a chain (not shown) extending from the vertical end supports 40 to the tongue 20. The apparatus 10 is then moved to the other end of the pipe 84 where the process is repeated for the next pipe section.

Figure 4:
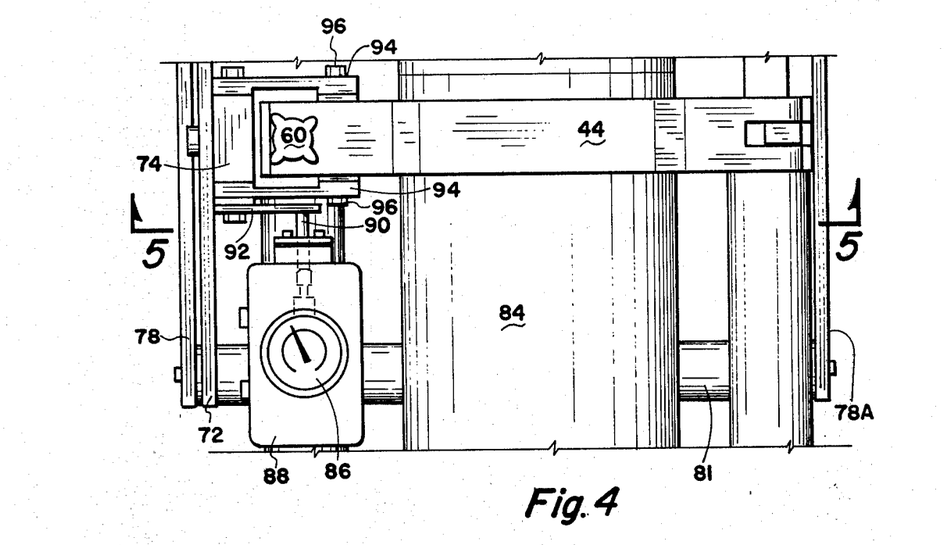
FIG. 4 is a partial top plan view of the present invention.
Figure 5:
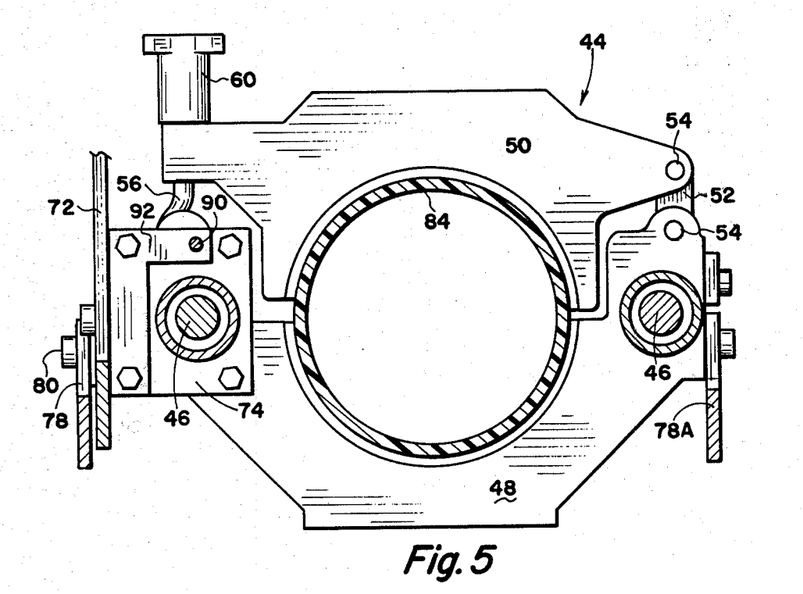
FIG. 5 is a view taken along line 5—5 of FIG. 4.

To ensure proper fusion of the pipes the correct pressure must be applied thereto for the specific composition and diameter of the pipes. The fusion devices which are normally used to fuse large diameter plastic pipe are equipped with hydraulic systems to move the pipes and thereby having means to indicate the amount of axial force applied to the pipes to ensure proper fusion. There has been no adequate means to directly read the total force applied to pipes on fusion devices which are normally used for smaller diameter pipes in that these devices are normally manually operated. The present invention is provided with means to indicate such total force. As shown in FIGS. 2 and 4, in order to visually indicate to the operator of the apparatus 10 the axial force applied to the pipes during fusion a force gauge 86 is connected between the movable jaw assemblies 42 and 44 and rest within a housing 88, which is connected to the cylinder 66. A plunger 90 in communication with the force gauge 86 extends a partial distance out from the housing 88 towards the jaw assembly 42. The plunger abuts against a vertical bar 92 (as shown in FIG. 5) which is bolted onto one edge of a vertical side edge of the bracket 74. As seen in FIG. 4, the bracket 74 is U-shaped with the wings 94 of the "U" connected on either side of the jaw assembly 42 by means of bolts 96. When the pipes 82 and 84 are brought into contact for fusion the operator will apply pressure downward upon the handle 70 by grasping an elongated handle portion 98 and pushing off from a second elongated handle 100 extending upwards from one of the vertical end supports 40. When a force is applied through the handle 70 bringing the ends of the pipes 82 and 84 into contact, the continued application of a force applied through the handle 70 and around a pivotal axis passing through the bolts 76 into the bracket 74 will tend to deflect the bracket 74 a certain distance to the left which will cause the unsecured portion of the bar 92 to deflect a partial distance which in turn will move the plunger 90. The movement of the plunger 90 causes the force gauge 86 to visually indicate the pounds per square inch of force interpreted from the distance of deflection. With the aid of the present invention, the operator may accurately fuse pipes together under the recommended force to ensure a satisfactory joint of fusion.

Figure 6:
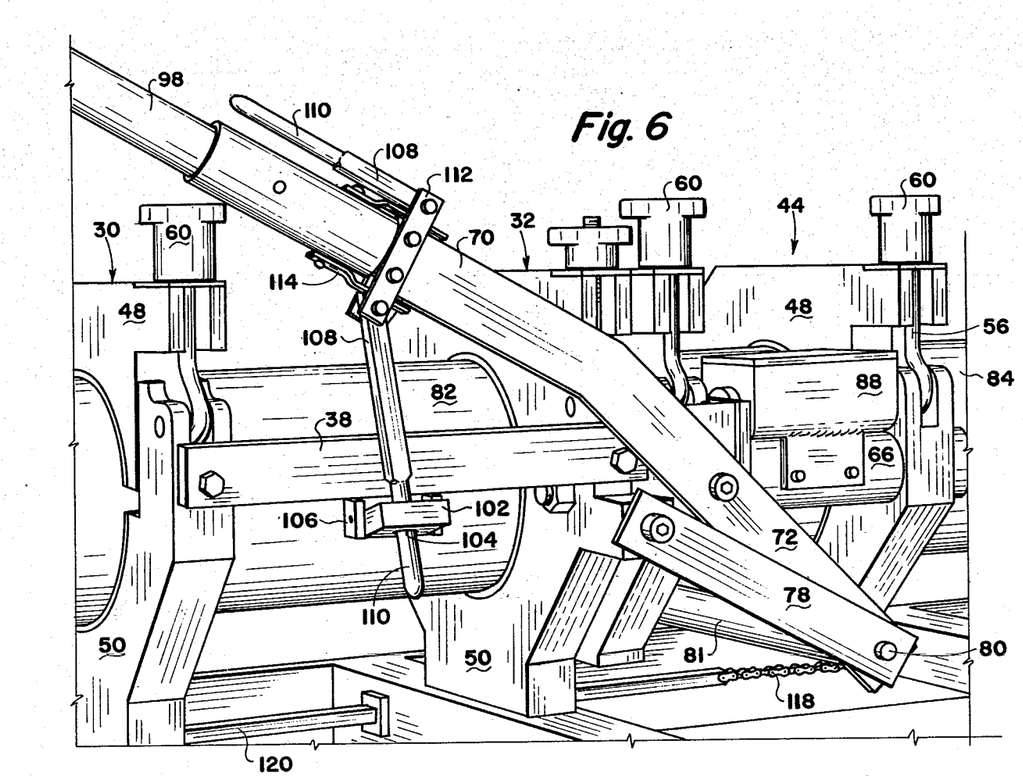
FIG. 6 is a partial side view of the present invention showing the detail of the retention means.

To ensure proper fusion of the pipe ends the required axial force must be maintained for a predetermined amount of time. The application of pressure by the operator pressing against the handle 70 can be fatiguing, especially in extreme weather conditions. The present invention is provided with means to secure the handle means 68 during the application of the fusion force. In order to maintain the required force and pin and bar means is provided. As best shown in FIG. 6, a member 102 having a rounded and elongated bore 104 spaced therein is pivotally connected at one end to a bracket 106, which is connected to a horizontal bar 38. A member 102 is biased by means of a spring (not shown) within the bracket 106 to maintain the member 102 at an upwards inclined angle. The handle 70 is provided with an elongated bar 108 having a round lower portion 110 with an upper portion of the bar 108 pivotally secured between a bracket 112, which is connected to the handle 70. A piece of spring metal 114 is connected to the handle 70 and extends between opposed members of the bracket 112 and against the end of the bar 108 so as to provide a resistance to the movement thereof. When the pipe ends are brought into contact for fusion and a force is applied to the handle 70 the rounded lower portion 110 of the bar 108 is brought towards and inserted into the bore 104 of the member 102. The configuration of the bore 104 as well as the biased angle thereof allows the insertion of the bar 108 but prevents the removal thereof. As can be seen, the operator applied a force to the handle 70 until the required force is indicated upon the force gauge 86 and the combination of the bar 108 with the member 102 maintains the handle 70 in position which in turn maintains the pipe ends in contact under the required force. After the pipe ends have been completely fused then the handle 70 is pressed downwards and the member 102 is rotated into a horizontal position and the rounded lower portion 110 of the bar 108 is easily removed by rotation of the handle 70.

Figure 7:
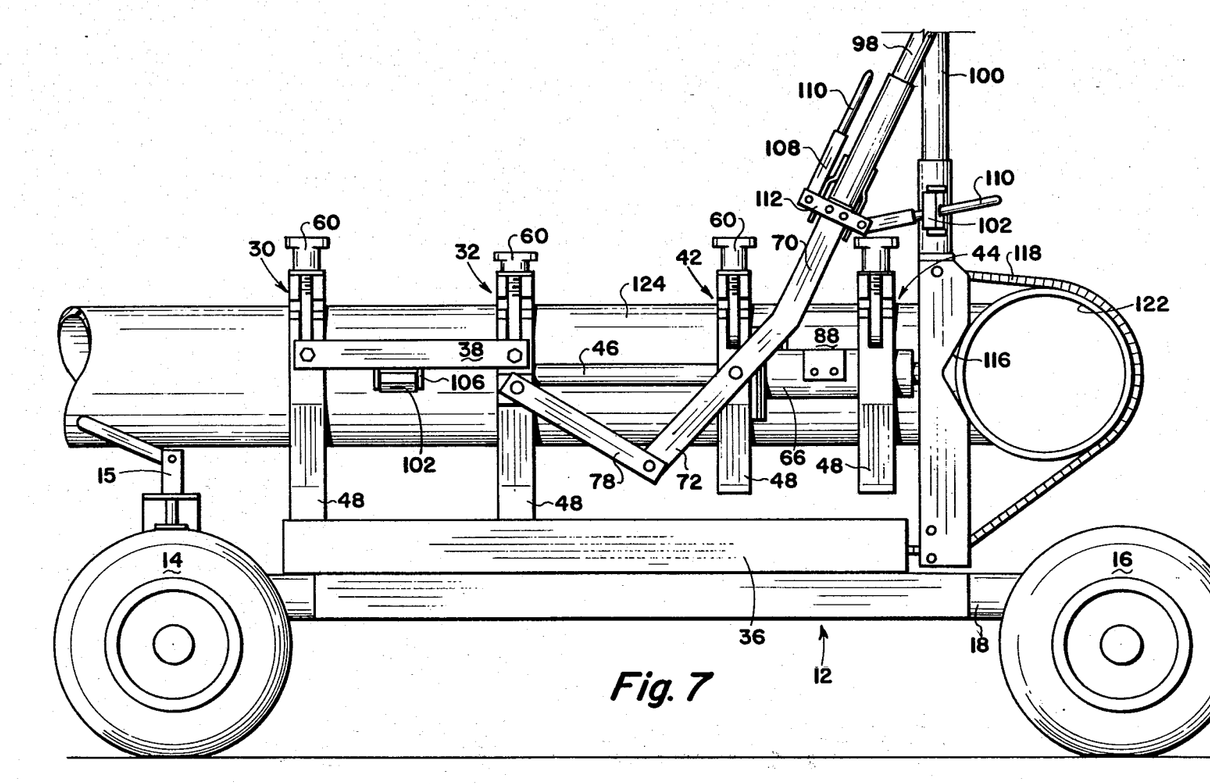
FIG. 7 is a view similar to FIG. 2 with a pipe secured to one end thereof for side wall fusion.

The above described operation of the invention is for end to end or but fusing. The present invention may also be used with side wall fusing of saddle joints or the like. The vertical end supports 40 are provided with notches 116, as shown in FIG. 7, as well as chains 18 and extending from an upper portion of each of the vertical end supports 40 around a pulley (not shown) in the lower portion thereof and extending horizontally along either edge of the frame 12 and are connected to bars 120 (as shown in FIG. 6) which in turn extend through the cross members 34 and are secured thereto. The chains 118 are provided with biasing means (not shown) within an upper portion of the end supports 40 to maintain tension to the chains 118. A pipe 122 which is to have another section of pipe 124 fused thereto is placed between the chains 118 and the notches 116 and tension is applied to the chains 118 through the bars 120 thereby securing the pipe 122. As shown in FIG. 7, the fixed jaw assemblies 30 and 32 are loosened and merely act as supports of the pipe 124. The movable jaw assemblies 42 and 44 are clamped securely around the pipe 124. The handle 70 to be rotated in an opposite direction as for end to end piping thereby bringing the pipe 124 into contact with the side wall of pipe 122. The fusion process for side wall fusing is the same as for end to end fusing. The force gauge 86 is adapted to read the amount of force applied through the handle 70 during the side wall fusion process also in that when the handle 70 is rotated and the pipe 124 comes into contact with the pipe 122 the bracket 74 is deflected to the right which moves the bar 92 to the left with this deflection being visually displayed by the force gauge 86 as total force either as positive or negative number as desired to differentiate the reading from end to end fusing. Further, the elongated handle 100 is provided with a biased member 102 and the handle 70 is provided with a second oppositely spaced bar 108 receivable within the second member 102 to maintain the required force during side wall fusing thereby freeing the operator to attend to other tasks.

As can be seen, the present invention provides a simple and efficient fusion apparatus which is provided with the novel features of being able to measure the amount of force during end to end or side wall fusing to ensure a proper joint and is provided with mechanical means to maintain the necessary force aiding in the reduction of operator fatigue and increasing operator efficiency.

Whereas the present invention has been described in particular relation to the drawings attached hereto, it should be understood that other and further modifications of the invention, apart from those shown or suggested herein, may be made within the scope and spirit of this invention.

What is claimed is:

1. An apparatus for fusing molten portions of pipe together comprising:
   a support frame;
   fixed clamp means on said support frame to retain a molten portion of said first section of pipe in a fixed axial position;
   movable clamp means adapted to retain a molten portion of a second section of pipe axially spaced from said molten portion of said first section of pipe, said movable clamp means movably supported upon guide rods, said guide rods fixed to said support frame on each side of said pipe the axis of which lies in an imaginery plane which intersects the central axis of said molten portions of said first and second pipe sections;
   means to move said clamp means bringing said molten pipe portions into contact for fusion; and
   means in communication with said movable clamp means to indicate the force applied to said molten pipe portions when drawn together into contact for fusion.

2. An apparatus as in claim 1 wherein said means to move said movable clamp means being pivotal handle means connected to said movable clamp means.

3. An apparatus as in claim 1 wherein said means to indicate the force applied to said molten portions of the pipe being a bracket with a first open end attached to said movable clamp means and with said handle means pivotally connected to a second closed end thereof, and an indicator means in communication with said bracket to measure the deflection thereof when the force is applied to said pipe portions through said handle means.

4. An apparatus as in claim 1 wherein means provided to maintain a given axial force applied to said first and said second pipe portions during fusion.

5. An apparatus as in claim 4 wherein said means to maintain a given axial force being a pin connected to said handle means and receivable within a catch means connected to said clamp means.

6. An apparatus as in claim 5 wherein said catch means being a block with an opening therein for receiving said pin, said block pivotally mounted and biased by spring means to prevent retraction of said pin.

7. An apparatus as in claim 1 wherein said support frame provided with securing means at one end thereof for holding a pipe transversely to the axis of the movable clamp means for side wall fusing.

8. An apparatus as in claim 7 wherein said securing means being a plurality of chains secured to said support frame and provided with chain tension means.

9. An apparatus as in claim 1 wherein said support frame being provided with wheels for rolling movement along the ground.

10. An apparatus as in claim 9 wherein said support frame being removably attached to said wheels.

11. An apparatus as in claim 10 wherein said wheels include a set of pivotal guide wheels, a tongue between said guide wheels, and roller means attached to said tongue to raise the fuse pipe out of said clamp means and support said pipe while moving said frame to the other non-fused end of said second pipe.

12. In an apparatus for fusing molten portions of a first and a second pipe together, including means to move the portion of the first pipe relative to the portion of the second pipe, the improvement comprising means in communication with said means to move to indicate the force being applied to said molten portions when drawn together into contact for fusion.

* * * * *